(12) United States Patent
Kim (10) Patent No.: US 9,194,463 B2
(45) Date of Patent: Nov. 24, 2015

(54) 10-SHIFT POWER TRAIN OF AUTOMATIC TRANSMISSION FOR VEHICLE

(71) Applicant: HYUNDAI POWERTECH CO., LTD, Chungcheongnam-do (KR)

(72) Inventor: Tae-Hoon Kim, Gyeonggi-do (KR)

(73) Assignee: Hyundai Powertech Co., Ltd., Chungcheongnam-do (KR)

( * ) Notice: Subject to any disclaimer, the term of this patent is extended or adjusted under 35 U.S.C. 154(b) by 0 days.

(21) Appl. No.: 14/369,633

(22) PCT Filed: Dec. 27, 2012

(86) PCT No.: PCT/KR2012/011550
§ 371 (c)(1),
(2) Date: Jun. 27, 2014

(87) PCT Pub. No.: WO2013/100620
PCT Pub. Date: Jul. 4, 2013

(65) Prior Publication Data
US 2014/0371026 A1    Dec. 18, 2014

(30) Foreign Application Priority Data
Dec. 29, 2011  (KR) .................. 10-2011-0145702

(51) Int. Cl.
*F16H 3/62*  (2006.01)
*F16H 3/66*  (2006.01)

(52) U.S. Cl.
CPC ............... *F16H 3/62* (2013.01); *F16H 3/666* (2013.01); *F16H 2200/0069* (2013.01); *F16H 2200/2012* (2013.01); *F16H 2200/2046* (2013.01)

(58) Field of Classification Search
CPC ... F16H 3/62; F16H 3/666; F16H 2200/0069; F16H 2200/2012; F16H 2200/2046
USPC ......................... 475/275–290, 330
See application file for complete search history.

(56) References Cited

U.S. PATENT DOCUMENTS 8,043,192 B2 * 10/2011 Phillips et al. ................ 475/282
(Continued)

FOREIGN PATENT DOCUMENTS

| JP | 2005-036894 A | 2/2005 |
| JP | 2005-083479 A | 3/2005 |
| JP | 2006-266481 A | 10/2006 |
| JP | 2006-349001 A | 12/2006 |

(Continued)

OTHER PUBLICATIONS

International Search Report in International Application No. PCT/KR2012/011550, filed Dec. 27, 2012.

*Primary Examiner* — Roger Pang
(74) *Attorney, Agent, or Firm* — Saliwanchik, Lloyd & Eisenchenk (57) ABSTRACT

The present invention provides a 10-shift power train of an automatic transmission for a vehicle, comprising: a first planetary gear set including a first sun gear selectively connected to a transmission casing, a first ring gear selectively connected to the transmission casing, and a first planetary carrier for integrally connecting a plurality of single pinions engaged between the first sun gear and the first ring gear; a second planetary gear set including a second sun gear directly connected to the first sun gear, a second planetary carrier directly connected to an input shaft and selectively connected to a third sun gear, and a second ring gear selectively connected to a fourth ring gear; a third planetary gear set including a third sun gear selectively connected to the second planetary carrier, a third planetary carrier selectively connected to the second ring gear, and a third ring gear selectively connected to the second ring gear; and a fourth planetary gear set including a fourth sun gear directly connected to the third planetary carrier, the fourth ring gear being directly connected to an output shaft, and a fourth planetary carrier directly connected to the first planetary carrier and to the third ring gear.

16 Claims, 4 Drawing Sheets

(56) References Cited

U.S. PATENT DOCUMENTS

| | | | |
|---|---|---|---|
| 8,052,566 B2 * | 11/2011 | Wittkopp et al. | 475/275 |
| 2010/0210395 A1 * | 8/2010 | Phillips et al. | 475/275 |
| 2013/0210570 A1 * | 8/2013 | Mellet et al. | 475/275 |

FOREIGN PATENT DOCUMENTS

| | | |
|---|---|---|
| JP | 2009-500572 A | 1/2009 |
| KR | 10-2011-0131816 A | 12/2001 |
| KR | 10-1063505 B1 | 9/2011 |

* cited by examiner

|      | C1 | C2 | C3 | C4 | B1 | B2 |
|------|----|----|----|----|----|----|
| 1st  |    |    | ●  |    | ●  | ●  |
| 2nd  |    | ●  |    |    | ●  | ●  |
| 3rd  |    | ●  | ●  |    |    | ●  |
| 4th  |    | ●  |    | ●  |    | ●  |
| 5th  |    |    | ●  | ●  |    | ●  |
| 6th  | ●  |    | ●  |    |    | ●  |
| 7th  | ●  |    | ●  | ●  |    |    |
| 8th  | ●  |    | ●  |    | ●  |    |
| 9th  |    |    | ●  | ●  | ●  |    |
| 10th | ●  |    |    | ●  | ●  |    |
| Rev  | ●  |    |    |    | ●  | ●  |

# 10-SHIFT POWER TRAIN OF AUTOMATIC TRANSMISSION FOR VEHICLE

CROSS-REFERENCE TO RELATED APPLICATIONS

This application is the U.S. national stage application of International Patent Application No. PCT/KR2012/011550, filed Dec. 27, 2012, which claims priority to Korean Application No. 10-2011-0145702, filed Dec. 29, 2011, the disclosures of each of which are incorporated herein by reference in their entirety.

TECHNICAL FIELD

The present invention relates to a power train of an automatic transmission for a vehicle, and more particularly, to a 10-shift power train of an automatic transmission for a vehicle.

BACKGROUND ART

In general, the multi-shift mechanism of an automatic transmission is implemented with a combination of a plurality of planetary gear sets, and a power train having such a plurality of planetary gear sets combined therein receives rotation power from a torque converter, changes the rotation power, and transfers the changed rotation power to an output shaft.

As the number of shift stages increases, the automatic transmission may be designed to have a more proper transmission gear ratio, which makes it possible to implement a vehicle with excellent power performance and fuel efficiency. Thus, research has been steadily conducted to implement an automatic transmission having a larger number of shift stages.

Furthermore, although automatic transmissions having an equal number of shift stages are applied, power trains thereof may have a different durability, power transmission efficiency, and size depending on a method of combining planetary gear sets. Thus, attempts have been made to develop a more reliable and compact power train which can reduce power loss.

A manual transmission has a disadvantage in that it must be frequently shifted by a driver as the number of shift stages increases. In the automatic transmission, however, a control unit controls the operation of a power train to shift gears, depending on an operation state. Thus, attempts have been continuously made to implement a power train having a larger number of shift stages.

From this point of view, 4-shift or 5-shift automatic transmissions have been typically used. Recently, however, a 6-shift automatic transmission has been developed and applied to vehicles, and research has been actively conducted to develop 8 or more-shift automatic transmissions for accomplishing higher fuel efficiency.

DISCLOSURE

Technical Problem

The present invention is conceived to solve such problems of the related art, and an aspect of the invention is to provide a 10-shift power train of an automatic transmission for a vehicle, which includes three single-pinion planetary gear sets and one double-pinion planetary gear set combined through a plurality of clutches so as to accomplish ten speeds and one reverse speed, thereby improving power transmission performance and reducing fuel consumption.

Technical Solution

In an embodiment, a 10-shift power train of an automatic transmission for a vehicle may include first to fourth planetary gear sets, first to fourth clutches, and first and second brakes. The first planetary gear set may include a first sun gear selectively connected to a transmission casing, a first ring gear selectively connected to the transmission casing, and a first planetary carrier for integrally connecting a plurality of single pinions engaged between the first sun gear and the first ring gear, the second planetary gear set may include a second sun gear directly connected to the first sun gear, a second planetary carrier directly connected to an input shaft and selectively connected to a third sun gear, and a second ring gear selectively connected to a fourth ring gear, the third planetary gear set may include the third sun gear selectively connected to the second planetary carrier, a third planetary carrier selectively connected to the second ring gear, and a third ring gear selectively connected to the second ring gear, and the fourth planetary gear set may include a fourth sun gear directly connected to the third planetary carrier of the third planetary gear set, the fourth ring gear directly connected to an output shaft, and a fourth planetary carrier directly connected to the first planetary carrier and directly connected to the third ring gear.

The third planetary carrier may be selectively connected to the second ring gear by the first clutch.

The third sun gear may be selectively connected to the second ring gear by the second clutch.

The third sun gear may be selectively connected to the second planetary carrier by the third clutch.

The third ring gear may be selectively connected to the second ring gear by the fourth clutch.

The first sun gear may be selectively fixed to the transmission casing by the first brake.

The first ring gear may be selectively fixed to the transmission casing by the second brake.

The third planetary gear set may have a double-pinion structure.

In another embodiment, a 10-shift power train of an automatic transmission for a vehicle may include first to fourth planetary gear sets, first to fourth clutches, and first and second brakes. The first planetary gear set may include a first sun gear selectively connected to a transmission casing, a first ring gear selectively connected to the transmission casing, and a first planetary carrier for integrally connecting a plurality of single pinions engaged between the first sun gear and the first ring gear, the second planetary gear set may include a second sun gear directly connected to a third sun gear, a second planetary carrier directly connected to an input shaft and selectively connected to the third sun gear, and a second ring gear selectively connected to the first ring gear, the third planetary gear set may include the third sun gear selectively connected to any one of the second planetary carrier and the second ring gear, a third ring gear selectively connected to the second ring gear, and a third planetary carrier selectively connected to the second ring gear, and the fourth planetary gear set may include a fourth sun gear directly connected to the third planetary carrier of the third planetary gear set, a fourth planetary carrier directly connected to the third ring gear, and a fourth ring gear directly connected to an output shaft.

The second ring gear may be selectively connected to the third planet carrier by the first clutch.

The second ring gear may be selectively connected to the third sun gear by the second clutch.

The second planet carrier may be selectively connected to the third sun gear by the third clutch.

The second ring gear may be selectively connected to the first planetary carrier and the third ring gear by the fourth clutch.

The first sun gear may be selectively fixed to the transmission casing by the first brake.

The first ring gear may be selectively fixed to the transmission casing by the second brake.

The third planetary gear set may have a double-pinion structure.

Advantageous Effects

According to the embodiments of the invention, three single-pinion planetary gear sets and one double-pinion planetary gear set may be combined only through the plurality of clutches so as to accomplish ten speeds and one reverse speed, thereby improving power transmission performance and fuel efficiency.

DESCRIPTION OF DRAWINGS

The above and other aspects, features and advantages of the invention will become apparent from the following detailed description in conjunction with the accompanying drawings, in which.

BEST MODE

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
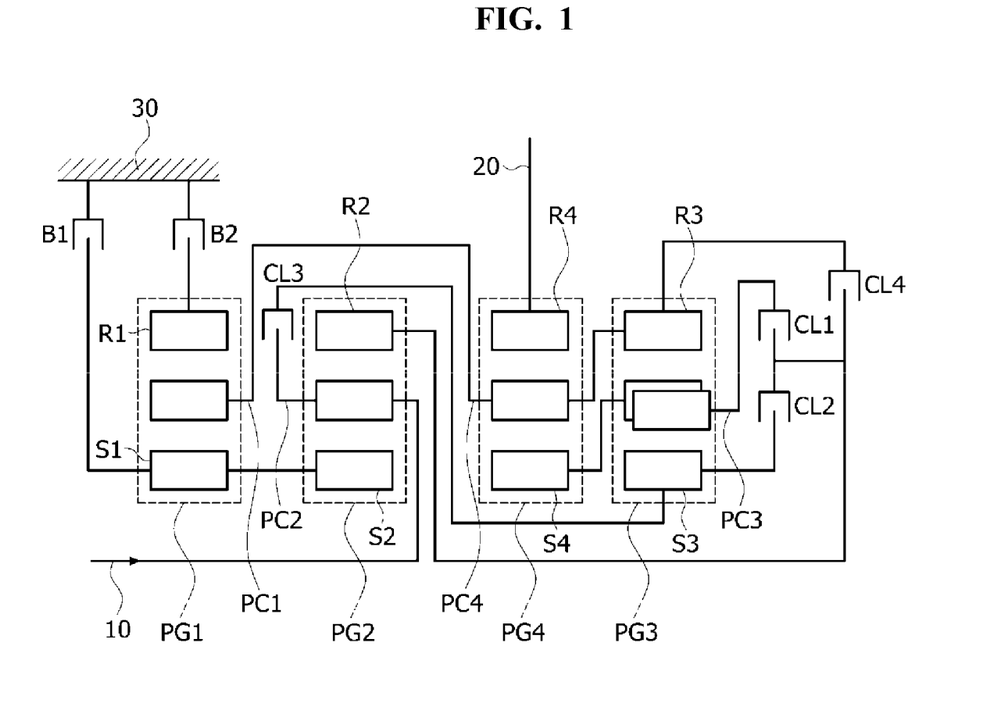
FIG. 1 is a diagram illustrating a 10-shift power train of an automatic transmission for a vehicle in accordance with an embodiment of the present invention.

FIG. 1 is a diagram illustrating a 10-shift power train of an automatic transmission for a vehicle in accordance with an embodiment of the present invention. As illustrated in FIG. 1, the 10-shift power train of the automatic transmission for a vehicle in accordance with the embodiment of the present invention includes first to fourth planetary gear sets PG1 to PG4, first to fourth clutches CL1 to CL4, and first and second brakes B1 and B2.

In the present embodiment, an input shaft 10 serving as an input member indicates a turbine shaft of a torque converter. Through the input shaft 10, rotation power from a crank shaft may be inputted while torque conversion is performed through the torque converter. An output gear 20 serving as output member drives left and right driving wheels through a well-known differential gear.

The first planetary gear set PG1 has three operating elements including a first sun gear S1, a first ring gear R1, and a first planetary carrier PC1. The first brake B1 is interposed between the first sun gear S1 and a transmission casing 30 such that the first sun gear S1 is selectively connected to the transmission casing 30. The first ring gear R1 is selectively fixed to the transmission casing 30 by the second brake B2. The first planetary carrier PC1 integrally connects a plurality of single pinions engaged between the first sun gear S1 and the first ring gear R1.

The second planetary gear set PG2 has three operating elements including a second sun gear S2, a second ring gear R2, and a second planetary carrier PC2. The second sun gear S2 is directly connected to the first sun gear S1. The second planetary carrier PC2 is directly connected to the input shaft 10, and selectively connected to a fourth sun gear S4 by the third clutch CL3. The second ring gear R2 is selectively connected to a fourth planetary carrier PC4, the fourth sun gear S4, and a fourth ring gear R4 by the first clutch CL1, the second clutch CL2, and the fourth clutch CL4, respectively.

The third planetary gear set PG3 may have a double-pinion structure, and have three operating elements including a third sun gear S3, a third ring gear R3, and a third planetary carrier PC3. The third sun gear S3 is selectively connected to the second planetary carrier PC2 by the third clutch CL3. The third ring gear R3 is directly connected to the fourth planetary carrier PC4 and selectively connected to the second ring gear R2 by the fourth clutch CL4. The third planetary carrier PC3 is directly connected to the fourth sun gear S4 and selectively connected to the second ring gear R2 by the first clutch CL1.

The fourth planetary gear set PG4 has three operating elements including the fourth sun gear S4, the fourth ring gear R4, and the fourth planetary carrier PC4. The fourth sun gear S4 is directly connected to the third planetary carrier PC3 of the third planetary gear set PG3. The fourth ring gear R4 is directly connected to the output shaft 20. The fourth planetary carrier PC4 is directly connected to the first planetary carrier PC1.

Each of the above-described first to fourth clutches CL1 to CL4 may be implemented with a multi-plate hydraulic friction coupling unit which is frictionally coupled by oil pressure.

Figure 2:
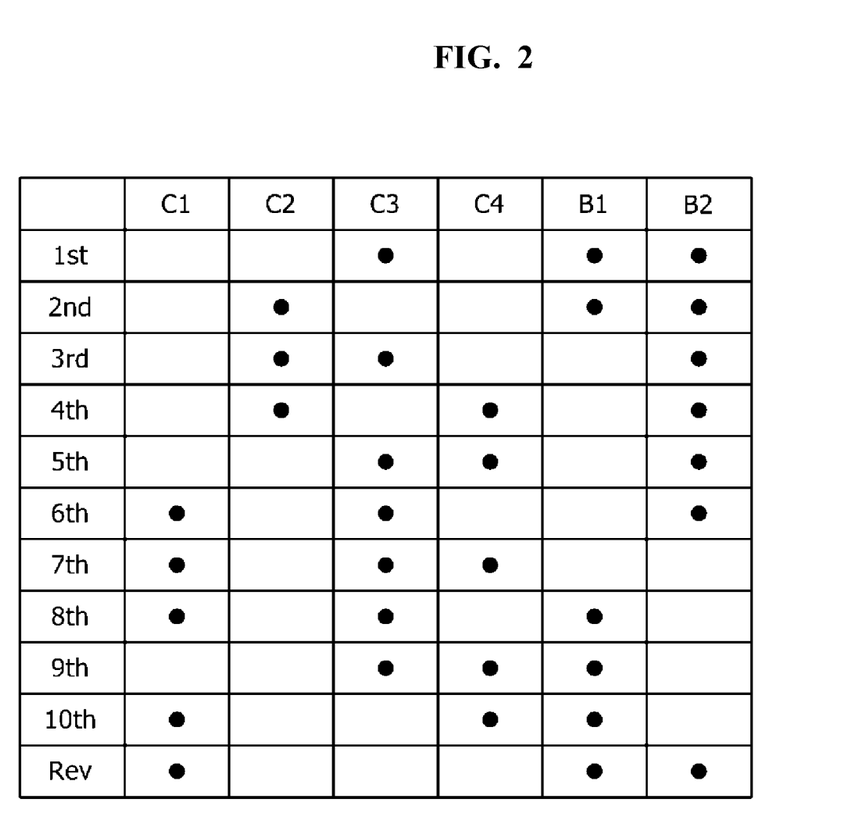
FIG. 2 is an operation table for friction elements applied to the 10-shift power train of the automatic transmission for a vehicle in accordance with the embodiment of the present invention.
Figure 3:
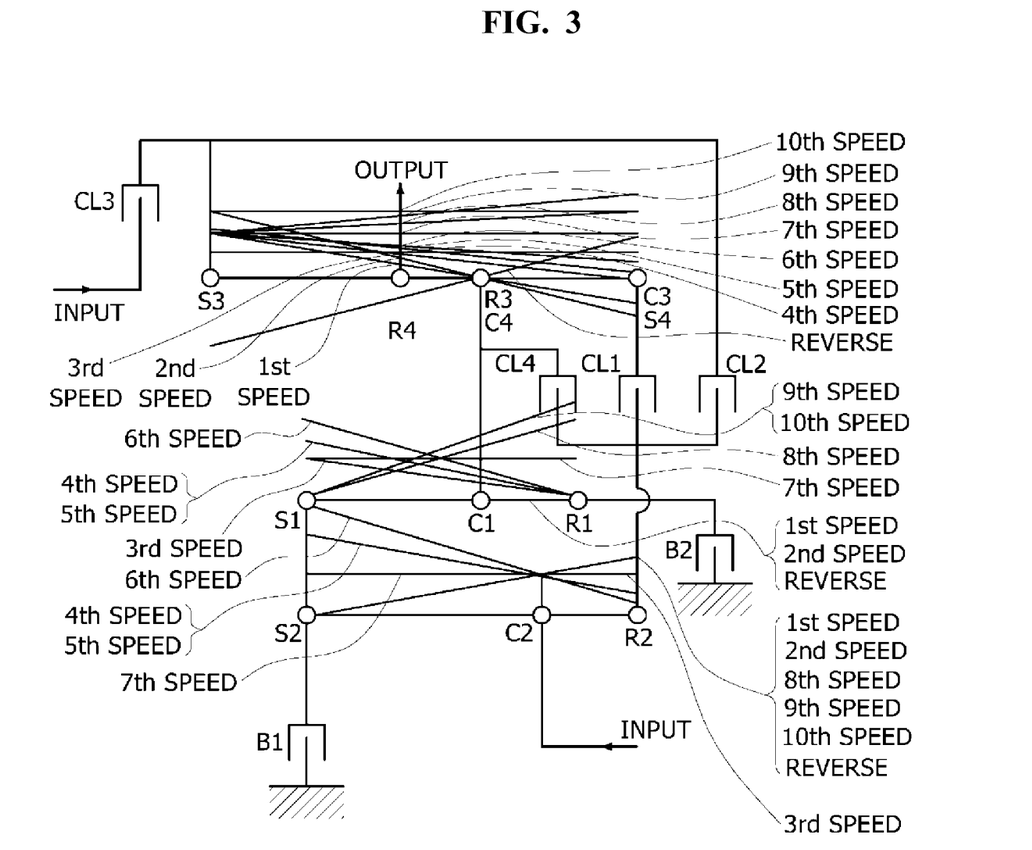
FIG. 3 is a diagram illustrating lever wires which are applied to the 10-shift power train of the automatic transmission for a vehicle in accordance with the embodiment of the present invention.

FIG. 2 is an operation table for the friction elements applied to the 10-shift power train of the automatic transmission for a vehicle in accordance with the embodiment of the present invention. FIG. 3 is a diagram illustrating lever wires which are applied to the 10-shift power train of the automatic transmission for a vehicle in accordance with the embodiment of the present invention. As illustrated in FIGS. 2 and 3, the 10-shift power train of the automatic transmission for a vehicle in accordance with the embodiment of the present invention performs gear shifting while the friction elements are operated. In FIG. 2, "•" indicates a connection state. At each shift stage, gear shifting is performed while two or three friction elements are operated. As illustrated in FIG. 3, the ratio of input and output speeds corresponding to rotation speeds of the respective fiction elements may be drawn to acquire a transmission gear ratio which is accomplished at each shift stage.

At a first speed, the operations of the third clutch CL3, the first brake B1, and the second brake B2 are controlled.

Thus, rotation power of the input shaft 10 is inputted to the second planetary carrier PC2, and rotation power of the secondary planetary carrier PC2 is transferred to the third sun gear S3 through the third clutch CL3. At this time, since the fourth planetary carrier PC4 and the third ring gear R3 are operated as fixed elements, the third planetary carrier PC3 is operated as an output element of the third planetary gear set PG3, and the fourth sun gear S4 directly connected to the third planetary carrier PC3 is operated as an input element of the fourth planetary gear set PG4. Thus, the first-speed transmission gear ratio is transferred to the output shaft 20 through the fourth ring gear R4.

At a second speed, the third clutch CL3 having operated at the first speed is released, and the second clutch CL2 is operated. At this time, since the first sun gear S1, the second sun gear S2, and the first ring gear R1 are fixed by the first and second brakes B1 and B2, the first planetary gear set PG1 including the first sun gear S1, the first planetary carrier PC1, and the first ring gear R1 is fixed. At this time, the rotation power of the input shaft 10 is inputted through the second planetary carrier PC2 of the second planetary gear set PG2 directly connected to the input shaft 10, and the rotation power outputted from the second ring gear R2 of the second planetary gear set PG2 is transferred to the third sun gear S3 of the third planetary gear set PG3. Thus, the third planetary carrier PC3 is operated as an output element, and the fourth sun gear S4 directly connected to the third planetary carrier PC3 is operated as an input element. Then, the second-speed transmission gear ratio is transferred to the output shaft 20 through the fourth ring gear R4.

At a third speed, the first brake B1 having operated at the second speed is released, and the third clutch CL3 is operated. At this time, the second sun gear S2 and the second ring gear R2 are directly connected through the second planetary carrier PC2 which receives rotation power from the input shaft 10, and the components of the second planetary gear set PG2 are integrally rotated. Furthermore, since the first ring gear R1 is operated as a fixed element by the second brake B2, the rotation power transferred through the first planetary carrier PC1 is transferred to the fourth planetary carrier PC4. Then, the third-speed transmission gear ratio is transferred to the output shaft 20 through the fourth ring gear R4 by the fourth planetary carrier PC4 and the third ring gear R3 via the third sun gear S3 which is rotated at the same speed as the second planetary gear set PG2.

At a fourth speed, the third clutch CL3 having operated at the third speed is released, and the fourth clutch CL4 is operated. At this time, rotation operation is transferred through the second planetary carrier PC2 from the input shaft 10. Since the first ring gear R1 is operated as a fixed element by the second brake B2, the rotation power outputted by the first sun gear S1 and the first planetary carrier PC1 is transferred to the fourth planetary carrier PC4 and the third ring gear R3. Thus, both of the third and fourth planetary gear sets PG3 and PG4 are rotated at the same speed, and the fourth-speed transmission gear ratio is transferred to the output shaft 20.

At a fifth speed, the second clutch CL2 having operated at the fourth speed is released, and the third clutch CL3 is operated. At this time, rotation power is transferred through the second planetary carrier PC2 from the input shaft 10. Since the first ring gear R1 is operated as a fixed element by the second brake B2, the rotation power outputted through the first sun gear S1 and the first planetary carrier PC1 is transferred to the fourth planetary carrier PC4 and the third ring gear R3. Thus, the fifth-speed transmission gear ratio is transferred to the output shaft 20 via the fourth ring gear R4.

At a sixth speed, the fourth clutch CL4 having operated at the fifth speed is released, and the first clutch CL1 is operated. At this time, rotation power is transferred through the second planetary carrier PC2 from the input shaft 10. Since the first ring gear R1 is operated as a fixed element by the second brake B2, the rotation power outputted by the first sun gear S1 and the first planetary carrier PC1 is transferred to the fourth planetary carrier PC4 and the third ring gear R3. Thus, the sixth-speed transmission gear ratio is transferred to the output shaft 20 via the fourth ring gear R4.

At a seventh speed, the second brake B2 having operated at the sixth speed is released, and the fourth clutch CL4 is operated. At this time, the rotation power transferred through the second planetary carrier PC2 from the input shaft 10 is directly connected to the third sun gear S3 through the third clutch CL3, and the second ring gear R2 is directly connected to the third planetary carrier PC3 and the third ring gear R3 through the first clutch CL1 and the fourth clutch CL4. Thus, rotation power having the seventh-speed transmission gear ratio in which the second to fourth planetary gear sets PG2 to PG4 are rotated at the same speed is transferred to the output shaft 20 through the third ring gear R3.

At an eighth speed, the fourth clutch CL4 having operated at the seventh speed is released, and the first brake B1 is operated. At this time, the first sun gear S1 and the second sun gear S2 are operated as fixed elements by the first brake B1, the rotation power transferred through the second planetary carrier PC2 from the input shaft 10 is directly connected to the third sun gear S3 through the third clutch CL3, and the second ring gear R2 is directly connected to the third planetary carrier PC3 through the first clutch CL1. Thus, the eight-speed transmission gear ratio is transferred to the output shaft 20 through the fourth ring gear R4.

At a ninth speed, the first clutch CL1 having operated at the eighth speed is released, and the fourth clutch CL4 is operated. At this time, the first sun gear S1 and the second sun gear S2 are operated as fixed elements by the first brake B1, the rotation power transferred through the second planetary carrier PC2 from the input shaft 10 is directly connected to the third sun gear S3 through the third clutch CL3, and the second ring gear R2 is directly connected to the third ring gear R3 and the third planetary carrier PC4 through the fourth clutch CL4. Thus, the ninth-speed rotation power is transferred to the output shaft 20 through the fourth ring gear R4.

At a tenth speed, the third clutch CL3 having operated at the ninth speed is released, and the first clutch CL1 is operated. At this time, since the first sun gear S1 and the second sun gear S2 are operated as fixed elements by the first brake B1, the rotation power transferred through the second planetary carrier PC2 from the input shaft 10 is transferred to the second ring gear R2, the fourth sun gear S4, and the fourth planetary carrier PC4 which are directly connected by the first clutch CL1. Thus, the fourth planetary gear set PG4 and the third planetary gear set PG3 are rotated at the same speed. At this time, the tenth-speed rotation power is transferred to the output shaft 20 through the fourth ring gear R4.

At a reverse speed, the first clutch CL1, the first brake B1, and the second brake B2 are operated. At this time, since the first sun gear S1 and the first ring gear R1 are fixed by the first and second brakes B1 and B2, all the components of the first planetary gear set PG1 are fixed. Furthermore, the fourth planetary carrier PC4 and the third ring gear R3 which are directly connected to the first planetary carrier PC1 are fixed, and the second ring gear R2 is directly connected to the fourth sun gear S4 and the third planetary carrier PC3 by the first clutch CL1 in a state where the second sun gear S2 is set to a fixed element. Thus, the reverse-speed rotation power is transferred to the output shaft 20 through the fourth ring gear R4 serving as an output element of the fourth planetary gear set PG4.

Figure 4:
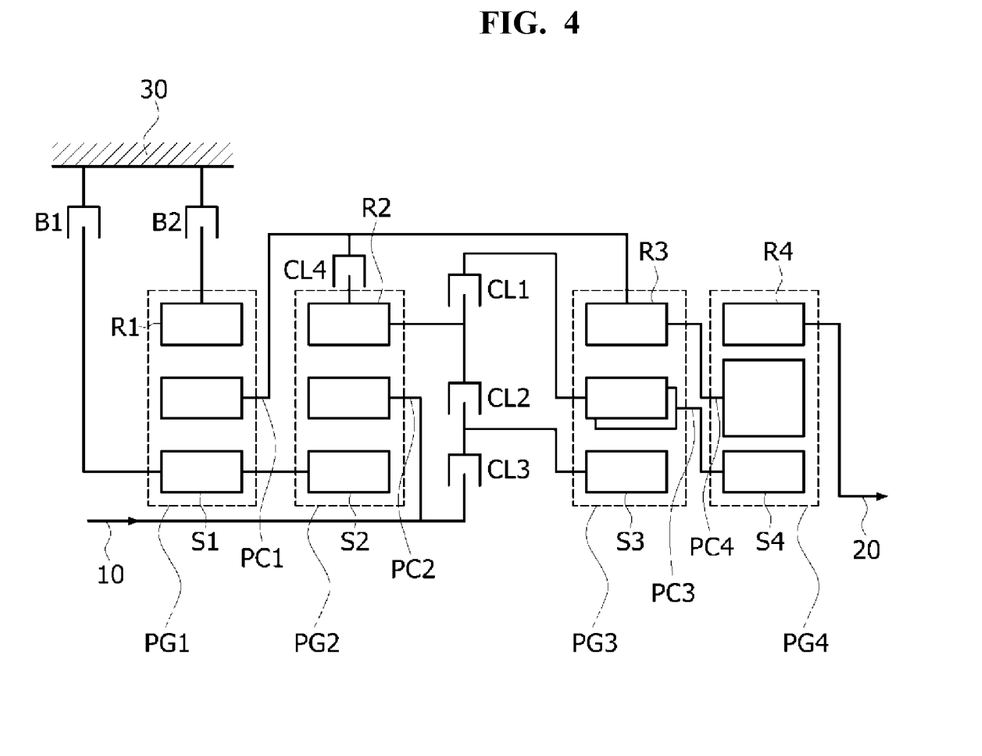
FIG. 4 is a diagram illustrating a 10-shift power train of an automatic transmission for a vehicle in accordance with another embodiment of the present invention.

FIG. 4 is a diagram illustrating a 10-shift power train of an automatic transmission for a vehicle in accordance with another embodiment of the present invention. As illustrated in FIG. 4, the 10-shift power train of the automatic transmission for a vehicle in accordance with the embodiment of the present invention may include three single-pinion planetary gear sets, one double-pinion planetary gear set, fourth clutches CL1 to CL4, and two brakes B1 and B2. The configuration of FIG. 4 indicates that the same components as those illustrated in FIG. 1 are used to construct a new combination.

That is, when the first to fourth planetary gear sets PG1 to PG4, the first to fourth clutches CL1 to CL4, and the first and second brakes B1 and B2 are used to form the 10-shift automatic transmission, the first planetary gear set PG1 includes a first sun gear S1, a first ring gear R1, and a first planetary carrier PC1. The first sun gear S1 is selectively fixed to a transmission casing 30 by the first brake B1, the first ring gear R1 is selectively fixed to the transmission casing 30 by the second brake B2, and the first planetary carrier PC1 integrally connects a plurality of single pinions engaged between the first sun gear S1 and the first ring gear R1.

The second planetary gear set PG2 includes a second sun gear S2, a second planetary carrier PC2, and a second ring gear R2. The second sun gear S2 is directly connected to the first sun gear S1, the second planetary carrier PC2 is directly connected to the input shaft 10 and selectively connected to a third sun gear S3 of the third planetary gear set PG3, and the second ring gear R2 is selectively connected to the first planetary carrier PC1 or a third ring gear R3 of the third planetary gear set PG3. The second ring gear R2 is selectively connected to a third planetary carrier PC3 by the first clutch CL1. Furthermore, the second ring gear R2 is selectively connected to the third sun gear S3 by the second clutch CL2. Furthermore, the second ring gear R2 is selectively connected to the first planetary carrier PC1 and the third ring gear R3 by the fourth clutch CL4.

The third planetary gear set PG3 includes the third sun gear S3, the third planetary carrier PC3, and the third ring gear R3. The third sun gear S3 is selectively connected to the input shaft 10, the third planetary carrier PC3 is selectively connected to the second ring gear R2, and the third ring gear R3 is directly connected to the first planetary carrier PC1 and selectively connected to the second ring gear R2. The third sun gear S3 is selectively connected to the input shaft 10 by the third clutch CL3. At this time, the third planetary gear set PG3 has a double-pinion structure.

The fourth planetary gear set PG4 includes a fourth sun gear S4, a fourth planetary carrier PC4, and a fourth ring gear R4. The fourth sun gear S4 is directly connected to the third planetary carrier PC3 of the third planetary gear set PG3, the fourth planetary carrier PC4 is directly connected to the third ring gear R3 of the third planetary gear set PG3, and the fourth ring gear R4 is directly connected to the output shaft 20.

Although some embodiments have been provided to illustrate the invention in conjunction with the drawings, it will be apparent to those skilled in the art that the embodiments are given by way of illustration only, and that various modifications and equivalent embodiments can be made without departing from the spirit and scope of the invention. The scope of the invention should be limited only by the accompanying claims.

The invention claimed is:

1. A 10-shift power train of an automatic transmission for a vehicle, comprising first to fourth planetary gear sets, first to fourth clutches, and first and second brakes,
   wherein the first planetary gear set comprises a first sun gear selectively connected to a transmission casing, a first ring gear selectively connected to the transmission casing, and a first planetary carrier for integrally connecting a plurality of single pinions engaged between the first sun gear and the first ring gear,
   the second planetary gear set comprises a second sun gear directly connected to the first sun gear, a second planetary carrier directly connected to an input shaft and selectively connected to a third sun gear, and a second ring gear selectively connected to the third sun gear,
   the third planetary gear set comprises the third sun gear selectively connected to the second planetary carrier, a third planetary carrier selectively connected to the second ring gear, and a third ring gear selectively connected to the second ring gear, and
   the fourth planetary gear set comprises a fourth sun gear directly connected to the third planetary carrier of the third planetary gear set, a fourth ring gear directly connected to an output shaft, and a fourth planetary carrier directly connected to the first planetary carrier and directly connected to the third ring gear.

2. The 10-shift power train of claim 1, wherein the third planetary carrier is selectively connected to the second ring gear by the first clutch.

3. The 10-shift power train of claim 2, wherein the third sun gear is selectively connected to the second ring gear by the second clutch.

4. The 10-shift power train of claim 3, wherein the third sun gear is selectively connected to the second planetary carrier by the third clutch.

5. The 10-shift power train of claim 4, wherein the third ring gear is selectively connected to the second ring gear by the fourth clutch.

6. The 10-shift power train of claim 1, wherein the first sun gear is selectively fixed to the transmission casing by the first brake.

7. The 10-shift power train of claim 1, wherein the first ring gear is selectively fixed to the transmission casing by the second brake.

8. The 10-shift power train of claim 1, wherein the third planetary gear set has a double-pinion structure.

9. A 10-shift power train of an automatic transmission for a vehicle, comprising first to fourth planetary gear sets, first to fourth clutches, and first and second brakes,
   wherein the first planetary gear set comprises a first sun gear selectively connected to a transmission casing, a first ring gear selectively connected to the transmission casing, and a first planetary carrier for integrally connecting a plurality of single pinions engaged between the first sun gear and the first ring gear,
   the second planetary gear set comprises a second sun gear directly connected to the first sun gear, a second planetary carrier directly connected to an input shaft and selectively connected to a third sun gear, and a second ring gear selectively connected to the first planetary carrier,
   the third planetary gear set comprises the third sun gear selectively connected to any one of the second planetary carrier and the second ring gear, a third ring gear selectively connected to the second ring gear, and a third planetary carrier selectively connected to the second ring gear, and the fourth planetary gear set comprises a fourth sun gear directly connected to the third planetary carrier of the third planetary gear set, a fourth planetary carrier directly connected to the third ring gear, and a fourth ring gear directly connected to an output shaft.

10. The 10-shift power train of claim 9, wherein the second ring gear is selectively connected to the third planet carrier by the first clutch.

11. The 10-shift power train of claim 10, wherein the second ring gear is selectively connected to the third sun gear by the second clutch.

12. The 10-shift power train of claim 9, wherein the second planet carrier is selectively connected to the third sun gear by the third clutch.

13. The 10-shift power train of claim 9, wherein the second ring gear is selectively connected to the first planetary carrier and the third ring gear by the fourth clutch.

14. The 10-shift power train of claim 9, wherein the first sun gear is selectively fixed to the transmission casing by the first brake.

15. The 10-shift power train of claim 9, wherein the first ring gear is selectively fixed to the transmission casing by the second brake.

16. The 10-shift power train of claim 9, wherein the third planetary gear set has a double-pinion structure.

\* \* \* \* \*